Nov. 8, 1932.   D. D. PAYNE   1,886,972

PRODUCTION OF PLASTIC SHEETS AND THE PRODUCT THEREOF

Filed Nov. 8, 1928

Daniel D Payne  Inventor

By his attorney

Patented Nov. 8, 1932

1,886,972

UNITED STATES PATENT OFFICE

DANIEL D. PAYNE, OF LEOMINSTER, MASSACHUSETTS, ASSIGNOR TO DU PONT VISCOLOID COMPANY, OF WILMINGTON, DELAWARE, A CORPORATION OF DELAWARE

PRODUCTION OF PLASTIC SHEETS AND THE PRODUCT THEREOF

Application filed November 8, 1928. Serial No. 317,996.

This invention relates to the manufacture of decorated plastic and, although not confined thereto, has more particular application to cellulose ester plastics such, for example, as cellulose nitrate and cellulose acetate plastic. By "plastics" I have more particular reference to materials softenable under heat and pressure, or the like, cellulose ester plastics exemplifying such compositions. The invention has more particular relation to the making of plastic containing flake-like or corpuscular pigments such as "pearl essence", flake metallic powders such as "bronze" powder (so-called), mercurous chloride, mica flake, and so on.

In the utilization of corpuscular pigments, a major problem is that of proper orientation of the particles. That is to say, when such particles are viewed flatwise, as they lie in the plastic, although they have some sheen, the sheen is not as high as is desirable, while, when the particles are viewed edgewise, they have practically no sheen; and the problem is to so "orient" the particles in the plastic that they will have the high sheen necessary for present day commercial goods. It is with this problem of orientation that the present invention more particularly concerns itself.

One object of the present invention is to provide a method whereby plastic sheets may be provided with decorative markings in the character of scars, whorls, and the like. Another object is to provide a method whereby plastics containing corpuscular pigment may be produced with the pigment particles properly oriented. A further object is to provide a method for the production of decorative plastic containing corpuscular pigment with the pigment particles properly oriented and with the plastic decorated with scars, whorls and the like. Another object is to provide a plastic having the decorative characteristics indicated. To these ends, and also to improve generally upon methods and products of the character indicated, the invention consists in the various matters hereinafter described and claimed.

Figure 1:
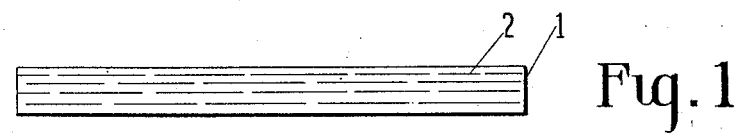
Figure 2:
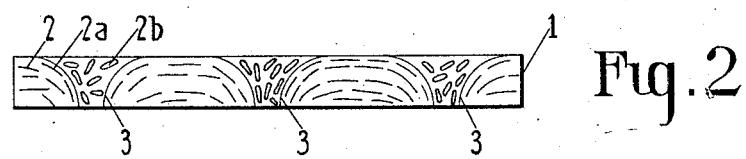
Figure 3:
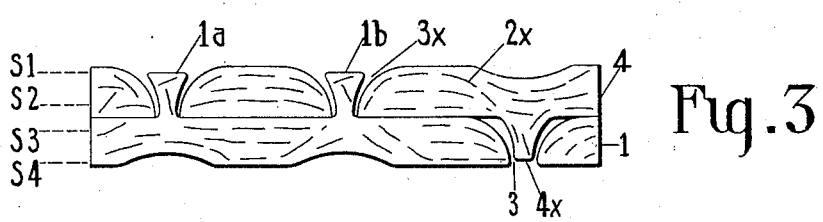
Figure 4:
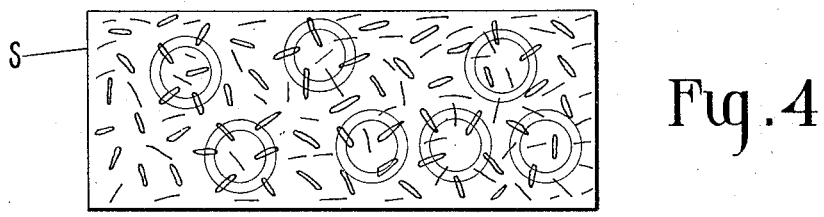

In the accompanying drawing, the various figures are diagrammatic and highly conventional, the pigment particles being greatly exaggerated in order the better to illustrate the invention. Fig. 1 is a vertical cross section of a sheet of plastic before being punched; Fig. 2 is a similar section of a sheet after being punched; Fig. 3 is a similar section of two punched sheets in the process of being united and coalesced in a cake pressing operation; and Fig. 4 is a face view of a completed sheet of plastic. In Figs. 1, 2 and 3, all cross hatching is omitted in order to avoid the obscurity of showing which would be incident to attempting to show the pigment particles in the presence of cross hatching.

Briefly stated, the invention includes subjecting a sheet of plastic to an operation whereby indentations, preferably holes extending through the sheet of plastic, are made in the plastic, the localized displacements of the plastic resulting from this operation resulting in scars, bubble-like effects, and so on in the finished plastic. When, as is particularly desirable, the plastic is pigmented with corpuscular pigment, the displacement operation brings about the tipping of the pigment particles in all directions from the original horizontal planes which they, for the most part, originally occupied; and this tipping from the horizontal planes gives the highly desirable orientation which I wish to obtain. That is to say, with the pigment particles so tipped, the various particles are viewed in a multiplicity of different aspects, some flatwise, some edgewise, some partially flatwise at a certain angle, some partially flatwise at a different angle, and so on. This orientation is, generally speaking, most evident near and adjacent the bubble marks or scars, and also these markings of themselves are pleasingly decorative, so that in plastic containing corpuscular pigment oriented by the present method of local displacement of the plastic, a particularly novel and pleasing decorative effect is secured.

The plastic used, and to which the invention is applicable, may be, as indicated above, of any desired type which is amenable to local displacement and ultimate solidification in such manner as to preserve the markings caused by the displacement, and which, in cases wherein it is desired to use corpuscular pigment, is of a character permitting the ready incorporation and orientation of such pigment. Cellulose ester plastics are particularly adaptable to these ends and, therefore, the invention is described with more particular reference to pyroxyline plastic, but it will be understood that it is not confined to such plastic.

The plastic sheet to which the present decorative process is applied may be produced in any desirable way, as by casting a suitable "dope" upon a suitable casting surface, permitting the same to harden into a sheet by the evaporation of solvents, and then stripping the sheet from the casting surface; or by making the plastic in the form of a dough by the usual mixing and rolling processes and producing sheets in any desired way, as by extrusion, or by cake pressing a stack of sheets from the rolls and sheeting the resulting press block. By way of illustration merely, a casting dope may be (parts by weight): pyroxylin, 100; camphor, 37; urea, .5; pearl essence (dry basis), .42; acetone, 350; butyl alcohol, 20 and denatured ethyl alcohol, 30; and a plastic may be (parts by weight): pyroxylin, 100; camphor, 35; urea, .1; denatured alcohol, 60 and pearl essence, .2. It will be noted that each of these compositions contains, as illustrating a composition containing corpuscular pigment, pearl essence, and, except for the silver sheen effect produced by the pearl essence, is substantially transparent. It will be understood, however, that suitable color-imparting ingredients may be used also if desired, care being taken, in cases where pearl essence is used, to use a coloring matter, as a dyestuff, which will not obscure the pearl essence. Since, in its broad aspects the invention includes the local displacement of plastic not containing corpuscular pigment, compositions may be used containing other pigments, or not containing pigments.

Referring now to the drawing, in Fig. 1 is illustrated a sheet of plastic 1 produced by any desired method, as by casting or mixing, rolling and cake pressing, containing particles of corpuscular pigment 2 (with only their edges visible). In plastic as produced by any of the usual methods and as illustrated in Fig. 1, the corpuscular pigment particles lie substantially in horizontal planes and have a unidirectional trend, as is well recognized by those skilled in the art. As a result of this, the sheet has no sheen, as viewed edgewise, and has not a particularly good sheen when viewed "flatwise" (as from above) as substantially all of the particles are viewed in substantially the same aspect and practically flatwise.

Proceeding in accordance with the invention, the sheet 1 is, as illustrated in Fig. 2, now subjected to an operation whereby the plastic is locally displaced in one or more places, and is desirably locally displaced at frequent intervals throughout the sheet, certain of these local displacements being indicated at 3. The displacing may be accomplished in any desired manner, but I have found it convenient to make indentations, as holes passing completely through the sheet, as illustrated in Fig. 2, by means of a suitable punching tool. As will be understood by those skilled in the art, it may be found desirable to soften the plastic by heating the same, say in hot water, to soften the plastic in order to make the punching operation easier. Obviously, the punching tool may be of any desired size and configuration, depending upon the shape and size of the hole desired, and I have found it convenient to use a cylindrical pointed punch of about $\frac{1}{4}''$ diameter.

As illustrated in Fig. 2, the punching operation not only displaces the plastic as such, but also displaces the pigment particles 2, certain of the particles being merely tipped out of the horizontal as indicated at $2^a$, and others being tipped not only out of the horizontal but also turned, so that as the plastic is viewed edgewise the face of the particle is visible more or less as indicated at $2^b$. It will be understood that the particles are tipped in all directions and that no attempt is made in the drawing to accurately indicate the tipping of them. Furthermore, the punching operation, inasmuch as it produces indentations, holes, or the like, provides, in the plastic, a series of air pockets as will be evident. These air pockets, when the sheet of plastic is later pressed, as when it is composited with other sheets, as described below, result in the production of decorative scars and bubble marks.

Referring now to Fig. 3, the sheet 1 is composited with an additional sheet, or sheets, in any desired number of the same or different colors, and so on, as exemplified by the sheet 4. As here illustrated the sheet 4 is also provided with local displacements $3^x$ and also contains corpuscular pigment $2^x$, but it will be understood that the sheet 4 need not necessarily contain corpuscular pigment or be provided with local displacements as, evidently, certain features of the invention may be retained to advantage when the sheet 1 is composited with plain plastic sheets, or plastic sheets of any other character. The compositing may desirably be done by subjecting the stacked sheets 1, 4 (and so on) to a cake pressing operation in the usual way under heat and pressure whereby the sheets are thoroughly coalesced and adhered the one to the other in a unitary whole or press block, solid and hard when cold. In the cake pressing operation, the plastic and deformable sheets conform more or less accurately, each to the shape of the other and, in consequence, as roughly and approximately shown in Fig. 3, portions as 1ᵃ and 1ᵇ of the sheet 1 pass into the holes 3ˣ of the sheet 4, and similarly, portions 4ˣ pass into the holes 3 of the sheet 1. In this way an additional orientation is brought about. Also in the mating of the sheets, some air is entrapped in the holes 3 and 3ˣ and this gives a scarred or bubbled effect.

The press block produced, as described just above for example, may now be sheeted in any desired way to produce the decorated sheets S in accordance with the invention, and these sheets are seasoned, press polished, or treated in any other desired manner to make them ready for ultimate use in toilet goods or what not. Desirably, of course, the press block is sheeted in planes approximately parallel to the faces of the majority of the corpuscular pigments. For illustration, since in the present process as described in detail the majority of the corpuscles lie approximately parallel to the sheets 1 and 4, the press block may be sheeted as indicated by the dotted lines S1, S2, S3, and S4, in Fig. 3. The sheet S thus produced is conventionally illustrated in Fig. 4. As there illustrated, it will be seen that the displacement marks appear in the finished product and also the corpuscular particles are oriented in a multiplicity of directions, so that, no matter from what direction the face of the sheet is viewed a great majority of the particles will be viewed in such an aspect that the sheen of the particle will appear. It will be understood by those skilled in the art that in the finished product S the displacement marks are in the character of scars, markings, and the like, rather than being in the character of actual indentations (unless perhaps under the microscope).

According to the desires of the decorator, the displacement marks may be placed at haphazard, as illustrated by the four displacement marks at the left of the sheet, or may be placed according to some set design as illustrated by the three displacement marks at the right of the sheet, which are arranged to delineate an equilateral triangle. Thus it will be seen from the foregoing that the present method provides for the production of a plastic sheet containing decorative markings, such as scars or bubble marks which may be arranged indiscriminately or according to a set design and which, in cases where the sheet contains corpuscular pigment, the pigment particles are properly oriented to give a high sheen and luster.

While in the above description more particular reference has been made to the compositing of several sheets into a press block and the sheeting of sheets from the block, it will be understood that this procedure need not necessarily be resorted to, as a single sheet, such as that illustrated in Fig. 2, may be desirably used as such. For instance, the sheet there illustrated may be considered as a cast sheet in which the holes were punched just prior to the full solidification of the dope whereby the dope hardened into a sheet with the displacements therein and the pigment particles locally oriented. Such a sheet, after stripping from the casting surface, may, of course, be seasoned, press polished, pressed to close the holes (while leaving scars), or what not, as desired.

I claim:

1. In the production of decorative plastic, pigmenting the composition with corpuscular pigment, forming the composition into a plastic sheet, locally displacing portions of the sheet to thereby scar the plastic and orient the corpuscular pigment particles, and hardening the plastic with the scars and orientation preserved.

2. In the production of decorative plastic, pigmenting the composition with corpuscular pigment, forming the composition into a series of plastic sheets, puncturing certain of said sheets to form holes therein in the character of air pockets, thereby to scar the plastic and orient the corpuscular pigment particles, cake pressing said sheets into a press block, and sheeting the block in approximate parallelism to the lie of the majority of the pigment particles and crosswise of the axes of said scars.

3. Decorative plastic embodying corpuscular pigment and a decorative marking in the character of a bubble-like scar, the pigment being locally oriented in and about the scar by virtue thereof.

In testimony whereof, I affix my signature.

DANIEL D. PAYNE.